(12) United States Patent
Wong et al.

(10) Patent No.: US 12,738,436 B2
(45) Date of Patent: Sep. 15, 2026

(54) BI-DIRECTIONAL SOLID-STATE DC CIRCUIT BREAKER WITH BREAKING SPEED CONTROL

(71) Applicant: Hong Kong Applied Science and Technology Research Institute Company Limited, Hong Kong (HK)

(72) Inventors: Shek Mong Wong, Hong Kong (HK); Xin Li, Hong Kong (HK); Tin Ho Li, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 166 days.

(21) Appl. No.: 18/948,685

(22) Filed: Nov. 15, 2024

(65) Prior Publication Data

US 2026/0142113 A1 May 21, 2026

(51) Int. Cl.
*H01H 71/10* (2006.01)
*H01H 71/12* (2006.01)
(Continued)

(52) U.S. Cl.
CPC ...... *H01H 71/1054* (2013.01); *H01H 71/125* (2013.01); *H02H 3/044* (2013.01); *H02H 3/087* (2013.01); *H02H 7/268* (2013.01)

(58) Field of Classification Search
CPC .. H01H 71/1054; H01H 71/125; H02H 3/044; H02H 3/087
See application file for complete search history.

(56) References Cited

U.S. PATENT DOCUMENTS 4,740,858 A * 4/1988 Yamaguchi .......... H01H 33/596 361/4
5,452,170 A * 9/1995 Ohde .................. H01H 33/596 361/13
(Continued)

FOREIGN PATENT DOCUMENTS

CN 206820455 U 12/2017
CN 112840517 A 5/2021
(Continued)

OTHER PUBLICATIONS

ISR and Written Opinion, PCT/CN2024/135876, Jul. 23, 2025.

*Primary Examiner* — Scott Bauer
(74) *Attorney, Agent, or Firm* — gPatent LLC; Stuart T. Auvinen

(57) ABSTRACT

A bidirectional circuit breaker has Breaking Speed Control (BSC) to prevent false triggering when an upstream fault occurs. A semiconductor switch has a Metal Oxide Semiconductor Field Effect Transistor (MOSFET), an Insulated Gate Bipolar Transistor (IGBT), and a varistor in three parallel branches that drive a positive output. An input capacitor between positive and negative inputs forms an LC network with an inductor connected to the positive input. A current sensor is connected between the inductor and the semiconductor switch. When the current sensor detects reverse current, a snubber switch is closed, connecting a snubber capacitor across both terminals of the inductor. A LCC network is formed that stores more energy than the LC network, spreading out a current spike caused by the upstream fault, reducing peak reverse current pulled through the circuit breaker by the upstream fault. Thus breaking speed is reduced when the snubber switch closes.

20 Claims, 15 Drawing Sheets

(51) Int. Cl.

| | |
|---|---|
| ***H02H 3/04*** | (2006.01) |
| ***H02H 3/087*** | (2006.01) |
| *H02H 7/26* | (2006.01) |

(56) References Cited

U.S. PATENT DOCUMENTS

| | | | | |
|---|---|---|---|---|
| 6,525,513 | B1 * | 2/2003 | Zhao ..................... | H02M 3/158<br>323/272 |
| 9,148,011 | B2 | 9/2015 | Magnusson et al. | |
| 9,478,974 | B2 * | 10/2016 | Gaxiola ................. | H02H 7/268 |
| 10,879,693 | B2 | 12/2020 | Harper et al. | |
| 10,910,817 | B2 * | 2/2021 | Horinouchi .............. | H01H 9/54 |
| 11,070,045 | B1 * | 7/2021 | Li ............................ | H02H 3/00 |
| 11,888,312 | B2 | 1/2024 | Zhang | |
| 2003/0183838 | A1 | 10/2003 | Huang et al. | |
| 2010/0061122 | A1 * | 3/2010 | Okubo .................. | H02M 3/158<br>363/20 |
| 2012/0275203 | A1 * | 11/2012 | Shimada ................. | H02M 1/34<br>363/84 |
| 2023/0361551 | A1 | 11/2023 | Stokman et al. | |

FOREIGN PATENT DOCUMENTS

| | | | |
|---|---|---|---|
| CN | 114256820 | A | 3/2022 |
| WO | WO2020045889 | A | 3/2020 |

* cited by examiner

BREAKER CONTROL
SAMPLE CURRENT I(N)
302
A
CHANGE IN CURRENT I(N) DIRECTION ?
308
Y
N
B
C

C
I(N) > THSC
320
N
A
Y
SHORT CIRCUIT DETECTED
322
D
DISCONNECT MAIN SWITCH (G3)
324
330
THERMAL TRIP PROTECTION TRIGGERED
DELAY 3 uS THEN PARALLEL BRANCH OFF (G2)
328
TURN OFF RELAY (G1)
329
END

BI-DIRECTIONAL SOLID-STATE DC CIRCUIT BREAKER WITH BREAKING SPEED CONTROL

FIELD OF THE INVENTION

This invention relates to circuit breakers, and more particularly to bi-directional circuit breakers with control of the breaking speed.

BACKGROUND OF THE INVENTION

Direct Current (DC) power and distribution networks are used in various systems including marine, battery storage, solar, Electric Vehicle (EV), and EV charging. A DC network may power devices in a DC building on a DC grid.

Similar to Alternating Current (AC) networks, DC networks need circuit breakers to protect power sources, loads, cables, and other components from damage when abnormal electric conditions occur, such as short circuit and overload.

Mechanical circuit breakers such as a Miniature Circuit Breaker (MCB) can be used to protect DC networks. However, these mechanical circuit breakers may take several milliseconds (ms) to open the circuit, but semiconductor-based power sources and loads can fail in microseconds (μs). The tiny semiconductor features can be destroyed a thousand times faster than the mechanical switch can act.

FIGS. 1A-1E highlight a false triggering problem in a DC network. In FIG. 1A, DC supply 100 provides DC power to a DC network that includes DC loads 114, 116, 118 that are on separate branches from DC trunk 110. DC trunk 110 can include several long cables or other transmission lines, and may have branches and various topographies. DC trunk 110 may include cables that exhibit a low-pass filtering effect due to parasitic inductances, resistances, and capacitances that are distributed along the cables. This filtering effect is exacerbated by longer cable lengths.

DC supply 100 is protected by circuit breaker 102 that is placed near DC supply 100 and may be a considerable distance from DC loads 114, 116, 118. DC loads 114, 116, 118 are protected by circuit breakers 104, 106, 108 that are located near the DC loads, along a branch from DC trunk 110. When circuit breakers 102, 104, 106, 108 are closed, DC supply 100 can power DC loads 114, 116, 118 by DC power that is transmitted and distributed through DC trunk 110.

In FIG. 1B, a short circuit occurs in DC load 116. This short causes a large current to be drawn by DC load 116. This large current is drawn from DC supply 100, but the parasitic inductances of DC trunk 110 limit how much current can be immediately drawn from DC supply 100 over the long cables in DC trunk 110.

Since circuit breaker 116 has a high rating, such as 500 amps, circuit breaker 116 does not immediately trip. Likewise, circuit breaker 102 has a high rating and does not trip immediately. However, the short in DC load 116 will continue to pull more and more current until circuit breakers eventually trip when their load rating is reached.

In FIG. 1C, the short in DC load 116 is pulling so much current that cannot be immediately supplied by DC supply 100 since the long cables between DC supply 100 and DC load 116 act as a low-pass filter, resisting rapid current surges. However, DC load 118 on a neighboring branch off of DC trunk 110 is closer in distance to DC load 116 than DC supply 100. Thus there may be less impedance between DC loads 116, 118 than between DC load 116 and DC supply 100. This lower impedance causes some current to be pulled from neighboring DC load 118 and into shorted DC load 114.

In FIG. 1D, the short in DC load 116 pulls more and more current from DC trunk 110. However, circuit breaker 106 does not trip until current reaches its load rating of 500 amps. The short in DC load 116 pulls more and more current from DC supply 100 and from neighboring DC load 118.

While circuit breakers 102 and 106 have a high rating, such as 500 amps or greater, circuit breaker 108 has a low rating of 70 amps. DC load 118 may be a smaller DC load and thus its circuit breaker 108 has a low rating such as 70 amps. Circuit breaker 108 may be a bidirectional breaker that trips at the same current level regardless of the direction of current flow.

Circuit breaker 108 trips first due to its low load rating. Circuit breakers 102, 106 remain closed. Now all the current being drawn from the short in DC load 116 must be pulled from DC supply 100.

In FIG. 1E, the short-circuit current continues to increase past 70 amps until the current reaches 500 amps. Then circuit breaker 106 trips and opens, stopping the short current being drawn from DC trunk 110 and from DC supply 100. Other branches of DC trunk 110 are then protected from the short in DC load 116.

Circuit breaker 108 tripped before circuit breaker 106, even though the short was in DC load 116 that is protected by circuit breaker 106. This false triggering is undesirable. Ideally, circuit breaker 108 would remain closed until after circuit breaker 106 is tripped, allowing DC load 118 to continue to receive power from DC supply 100 once DC trunk 110 is protected by circuit breaker 106 opening to isolate the short on DC load 116.

To prevent this false triggering, the rating of circuit breaker 108 could be increased to 500 amps to match the rating of circuit breaker 106. However, this may be undesirable or even dangerous. DC load 116 may have a high-power DC motor that can draw 400 amps, and this requires that its circuit breaker 106 have a high rating such as 500 amps. However, neighboring DC load 118 may have only small DC devices that never draw more than 50 amps, or may have a battery backup or Energy Storage System (ESS) that is limited to 50 amps. Thus circuit breaker 108 needs to have a low rating, such as 70 amps, to protect smaller DC load 118. Increasing the rating of circuit breaker 108 from 70 amps to 500 amps could allow a short in small DC load 118 to draw 500 amps before opening, and this large current could damage the smaller devices or ESS in DC load 118.

FIG. 2 is a graph showing breaking speed for the example of FIGS. 1A-1E. Line 130 shows the current drawn through circuit breaker 106 into DC load 116 when the short begins at time zero. Current drawn through circuit breaker 106 and into DC load 116 increases until the current reaches the rating of circuit breaker 106 at 10 μs, when circuit breaker 106 opens.

Some of the current through circuit breaker 106 is drawn from neighboring DC load 118 rather than from DC supply 100, as shown in FIG. 1C. This neighboring current is shown as line 132. While this neighboring current is less than the current of line 130, the lower 7 amp rating of circuit breaker 108 is reached in less time. Once the current pulled backwards from neighboring DC load 118 reaches 70 amp, circuit breaker 108 opens. In this example, circuit breaker 108 trips at 3 μs while larger circuit breaker 106 trips later, at 10 μs. This false triggering of neighboring circuit breaker

108 at 3 μs is undesirable since there is no fault in neighboring DC load 118 that is protected by neighboring circuit breaker 108.

Lines 130, 132 are idealized for this example. In a real system lines 130, 132 are likely curves with various shapes and irregularities. However, neighboring circuit breaker 108 will likely still trigger earlier than circuit breaker 106 with the higher load rating.

FIG. 3 shows current and voltage waveforms of the false triggering situation of FIGS. 1A-1E. Waveform curve 70 shows the current though circuit breaker 106 when the short occurs in its DC load 116. Waveform curve 70 is clipped at the top due to the very high current spikes that occur. These current spikes eventually cause gate signal G3 to be driven high (curve 74), which opens circuit breaker 106, causing the voltage across circuit breaker 106 to increase (curve 72).

Before circuit breaker 106 opens, current is drawn backwards though neighboring circuit breaker 108, as shown by current curve 80. When current curve 80 exceeds the 70 amp rating of circuit breaker 108, then its G3 control signal is driven high (curve 84) and circuit breaker 108 opens, causing the voltage across circuit breaker 108 to fluctuate (curve 82).

Curves 80, 82, 84 are delayed relative to curves 70, 72, 74 due to the transmission-line delays through the cables between circuit breakers 106, 108. It takes some time for the current spike of curve 80 to propagate through the cables to neighboring DC load 118. Thus neighboring circuit breaker 108 opens after circuit breaker 106 opens when these transmission-line delays are accounted for. The simplified example of FIGS. 1A-1E ignores these transmission-line delays and shows circuit breaker 108 triggering before circuit breaker 106. Note that curve 80 shows negative (reverse) current through circuit breaker 108 while curve 70 shows positive (forward) current through circuit breaker 106.

What is desired is a semiconductor-based circuit breaker with Breaking Speed Control (BSC) to prevent false triggering when the short is in a neighboring branch. A bidirectional circuit breaker with both semiconductor circuit breakers and a mechanical relay that protects both poles is desired. A circuit breaker device that detects backwards current to actively increase switch impedance and energy storage to prevent the backwards current from falsely triggering the circuit breaker is desired.

DETAILED DESCRIPTION

The present invention relates to an improvement in circuit breakers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 4:
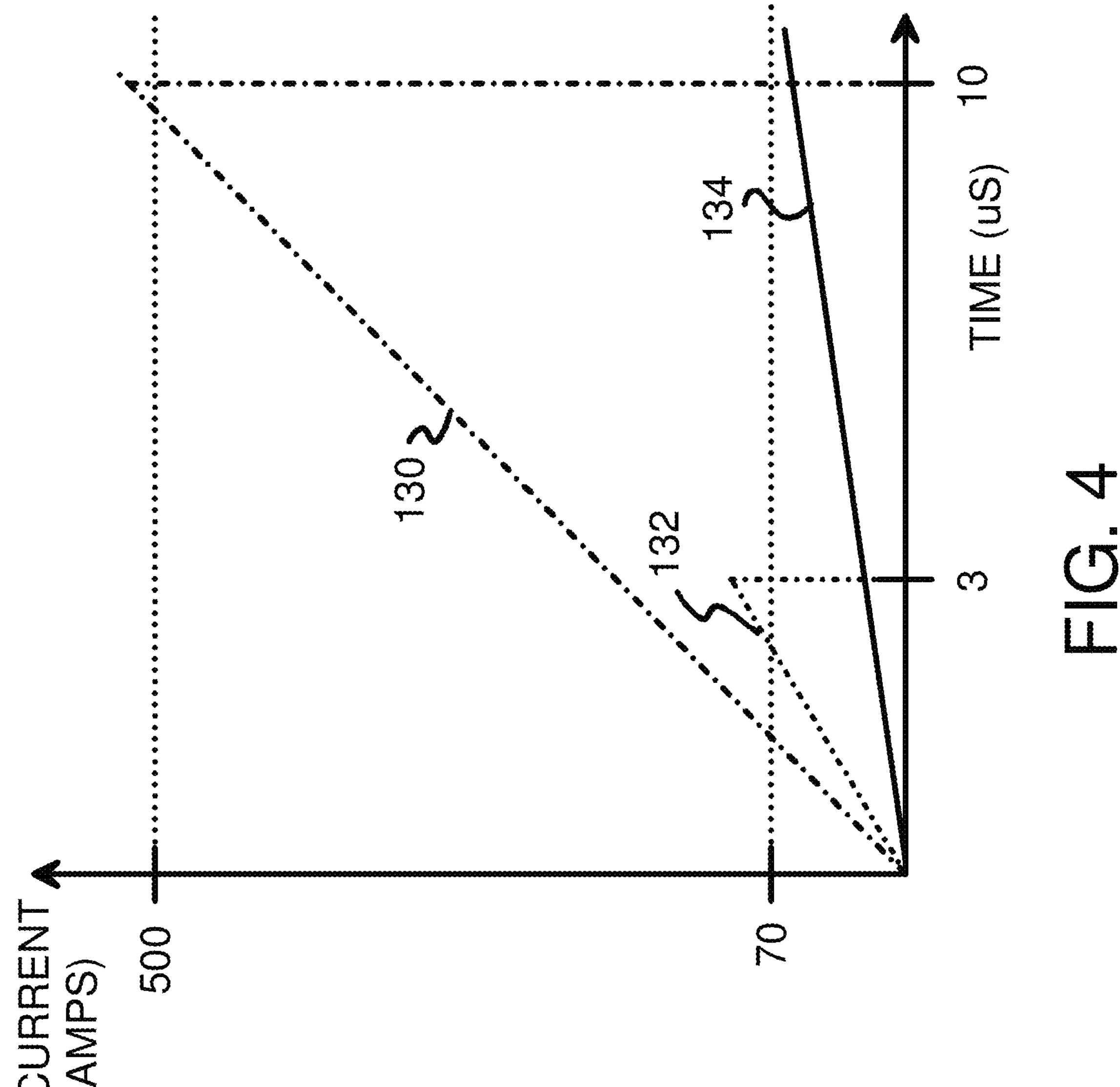
FIG. 4 is a graphs showing a circuit breaker with active Breaking Speed Control (BSC) to prevent false triggering.

FIG. 4 is a graphs showing a circuit breaker with active Breaking Speed Control (BSC) to prevent false triggering. A short occurs on the branch protected by a 500 amp circuit breaker, causing its current to rise sharply, as shown by curve 130. Once the 500 amp rating is reached at 10 μs, the circuit breaker opens.

Figure 1A:
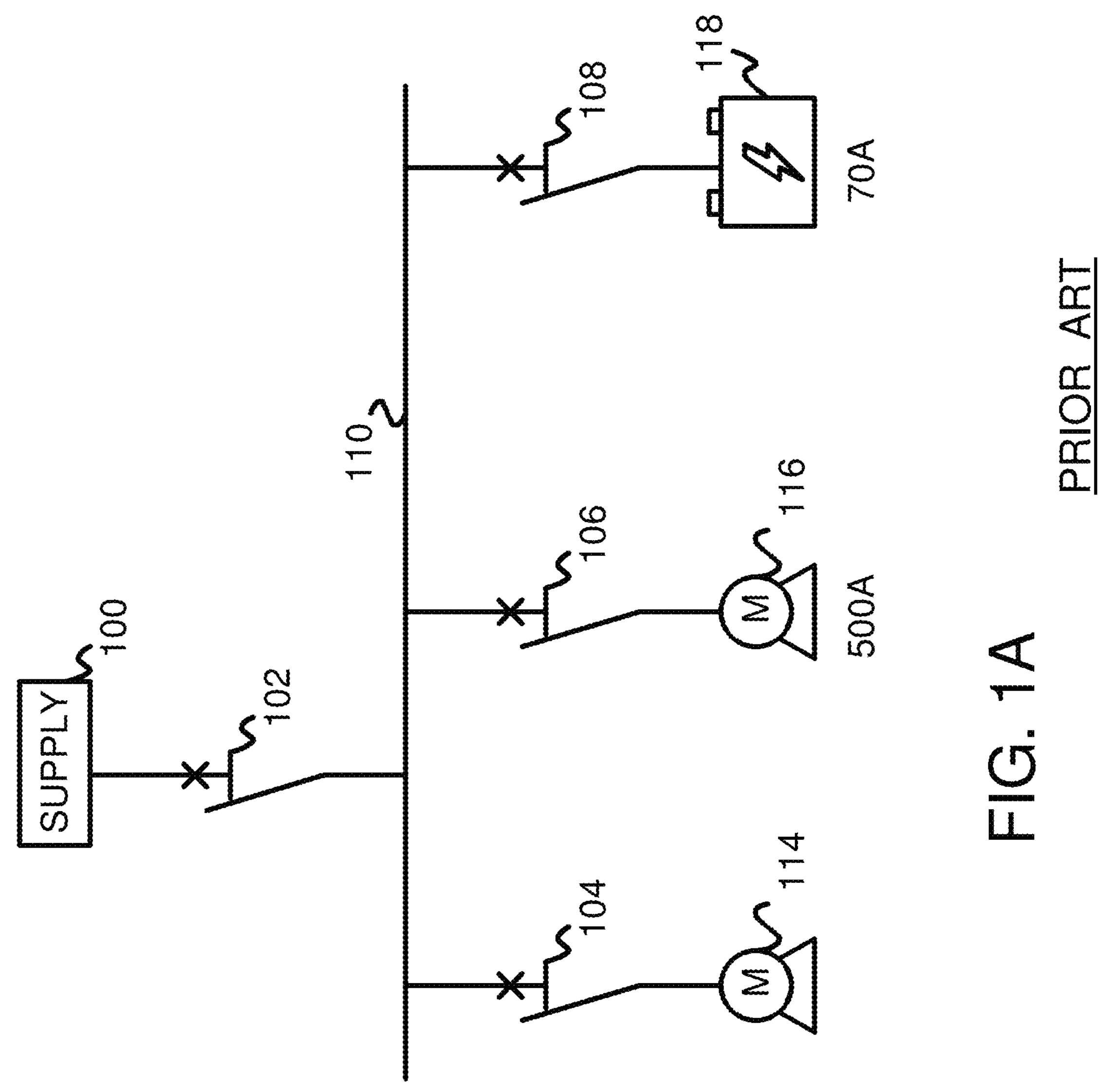
FIGS. 1A-1E highlight a false triggering problem in a DC network.
Figure 1B:
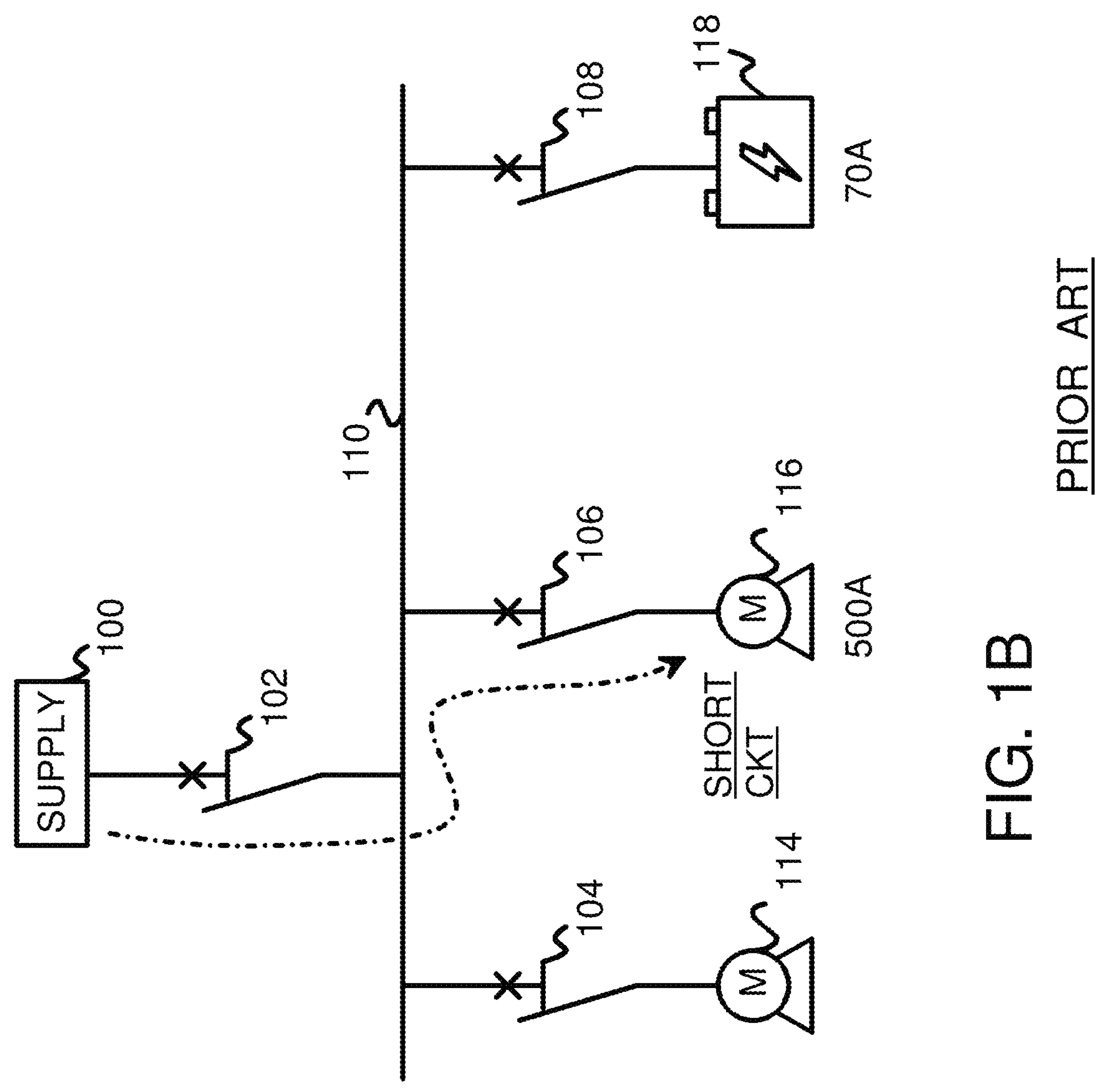

A neighboring circuit breaker would falsely trigger at 3 μs, as shown by curve 132, when some of the current of curve 130 is pulled backwards though the neighboring circuit breaker. However, this neighboring circuit breaker has Breaking Speed Control (BSC), which is activated when the backwards current is detected. Then the impedance and energy storage of the neighboring circuit breaker is increased. This increased impedance and energy storage diverts the backwards current spike, reducing the current that passes through the neighboring circuit breaker 108 and into its DC load 118 (FIG. 1A). The diverted current causes the slope of curve 132 to be reduced, resulting in curve 134.

The lower slope of curve 134 causes the 70 amp rating to be reached later, after 10 μs, rather than at 3 μs. This extra time before reaching the circuit breaker rating current limit of 70 amps allows more time for circuit breaker 106 to open, and for the current spike to subside. Ideally, circuit breaker 106 reaches its limit (500 amps) before neighboring circuit breaker 108 reaches its limit of 70 amps. Then neighboring circuit breaker 108 would not falsely trigger. Neighboring circuit breaker 108 can remain closed, allowing DC load 118 to remain powered despite the short in DC load 116 (FIG. 1E).

Figure 5:
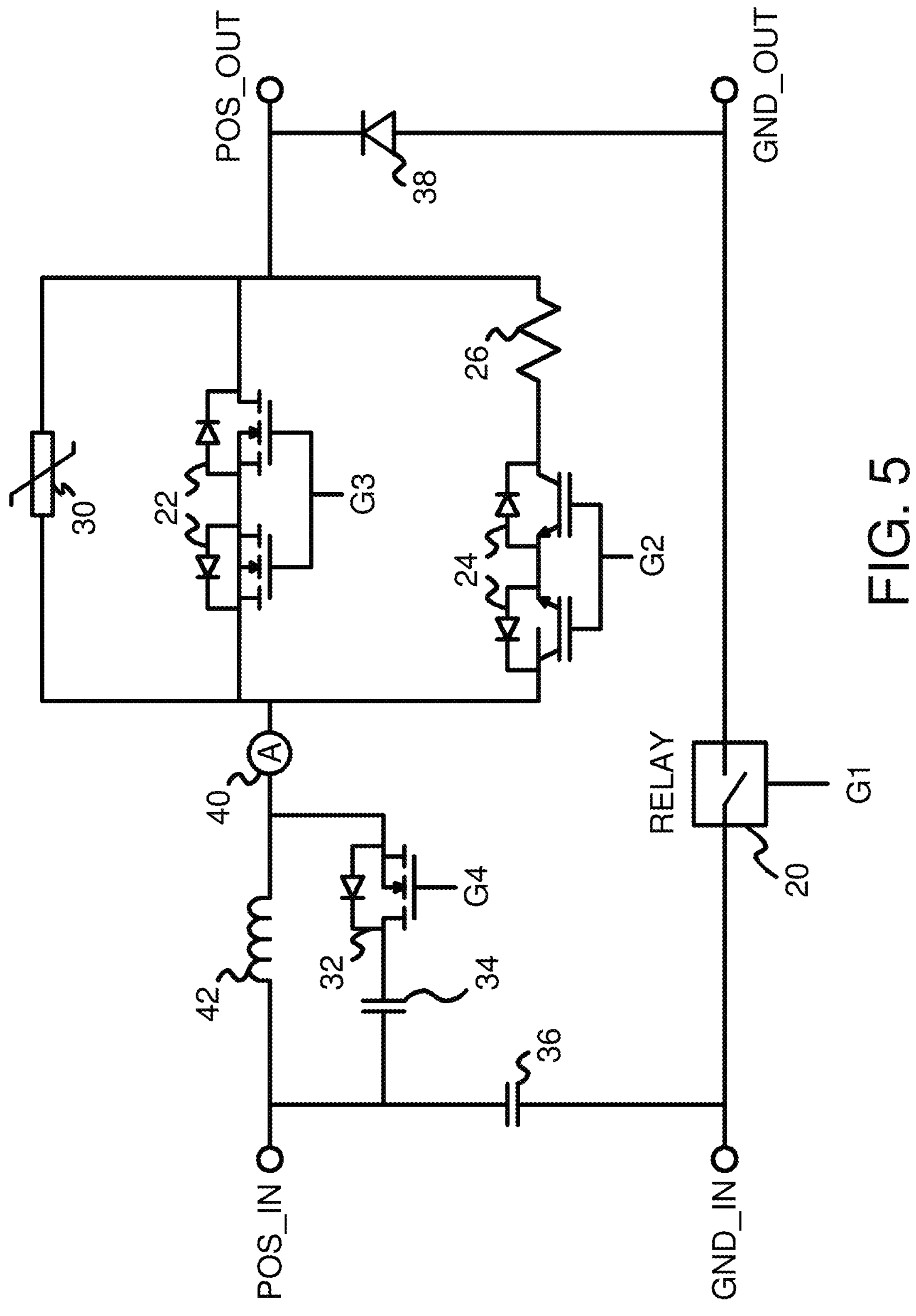
FIG. 5 is a diagram of a circuit breaker with Breaking Speed Control (BSC).

FIG. 5 is a diagram of a circuit breaker with Breaking Speed Control (BSC). Mechanical relay 20 disconnects the input ground GND_IN from the output ground GND_OUT to the DC network when gating signal G1 is in an inactive state, such as a low voltage. Mechanical relay 20 is relatively slow and can be an electro-mechanical relay with a moving plate that is pulled when an electromagnet is powered to open (or close) the relay contacts.

The power supply's positive terminal, POS_IN, is disconnected from the positive terminal, POS_OUT, to the DC network by semiconductor switches that include Metal-Oxide-Semiconductor Field-Effect Transistor (MOSFET) 22 and Insulated Gate Bipolar Transistor (IGBT) 24. Together, MOSFET 22, IGBT 24, and varistor 30 form a semiconductor switch having 3 branches.

There are no mechanical switches between POS_IN and POS_OUT, only semiconductor switches. For the negative pole, between GND_IN and GND_OUT, there are no semiconductor switches, only a mechanical switch. Thus the positive pole has purely semiconductor switches, while the negative pole has purely mechanical switches. This provides a very quick disconnection of the positive pole, but a much slower disconnection of the negative pole. Having purely semiconductor switches in the positive pole, and purely mechanical switches in the negative pole allows for both poles to be disconnected, without the added cost of semiconductor switches in the negative pole.

Diode 38 turns on if the output polarity is reversed, with POS_OUT being below GND_OUT. Diode 38 offers protection for unusual current spikes such as can occur due to shorts on the downstream DC load.

In the main branch, MOSFET 22 is switched off by gating signal G3. In the bypass branch, IGBT 24 is switched off by gating signal G2. IGBT 24 is in series with resistor 26 in the bypass branch. IGBT 24 can be two NPN bipolar transistors that receives G2 on their insulated gates (over their bases) while MOSFET 22 can be two n-channel enhancement-type transistors that receives G3 on their gates. Thus MOSFET 22 is a bidirectional switch and IGBT 24 is a bidirectional switch.

The third branch is the protection branch. Varistor 30 can be a Metal-Oxide Varistor (MOV) with a non-linear variable resistance that provides suppression of voltage spikes and clamping. The resistance of varistor 30 can be very large at normal operating voltages. However, the resistance of varistor 30 is reduced when high voltages are applied. Thus varistor 30 provides clamping of large voltage spikes.

The majority of the current passes through the main branch and MOSFET 22 during normal operations, since the MOSFET 22 can conduct with a low source-to-drain voltage while IGBT 24 in series with resistor 26 requires a larger voltage to conduct a given current. Varistor 30 requires a much higher voltage to conduct, so the third branch does not carry current during normal operation without large voltage spikes.

Figure 1C:
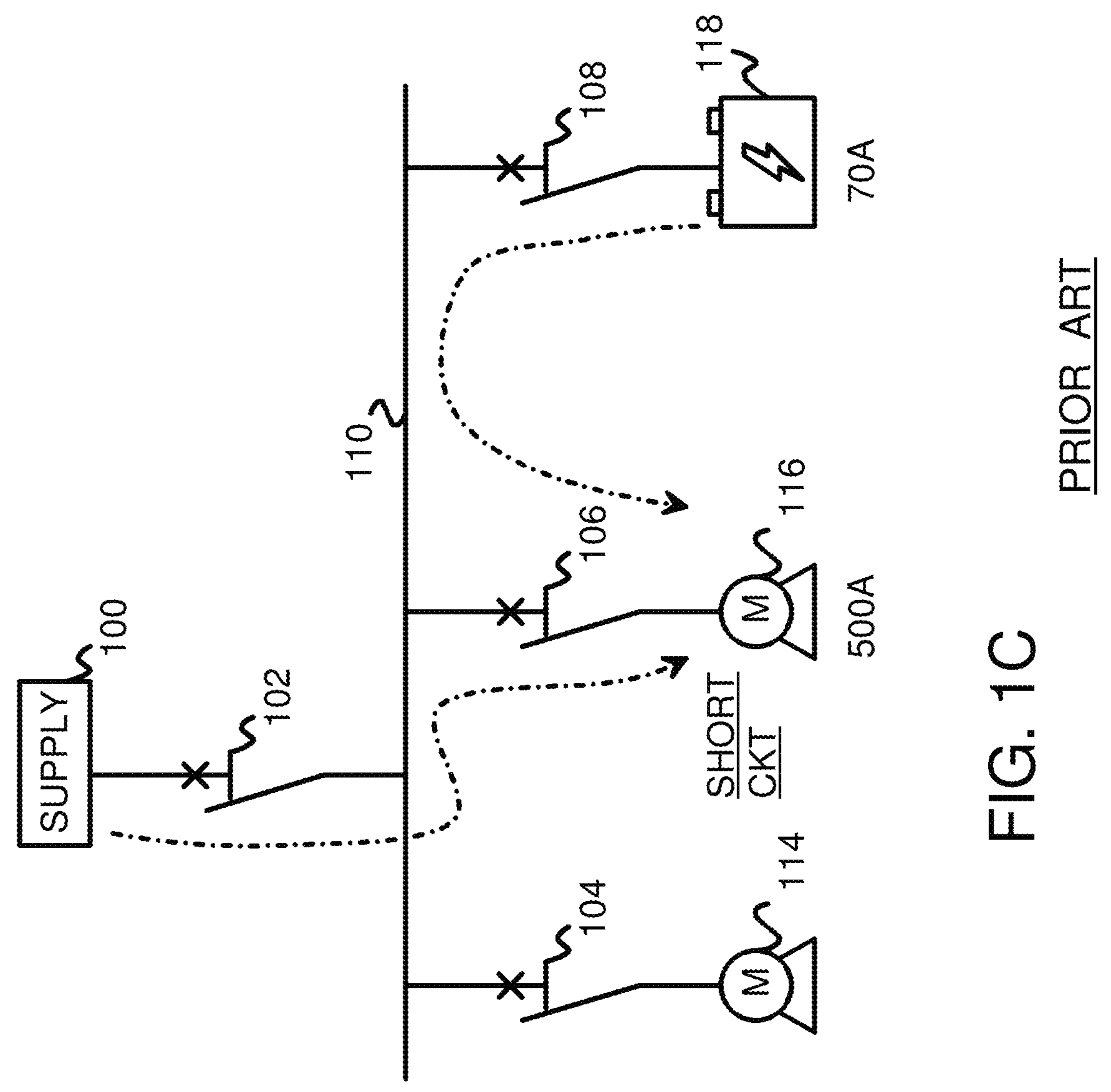
Figure 1D:
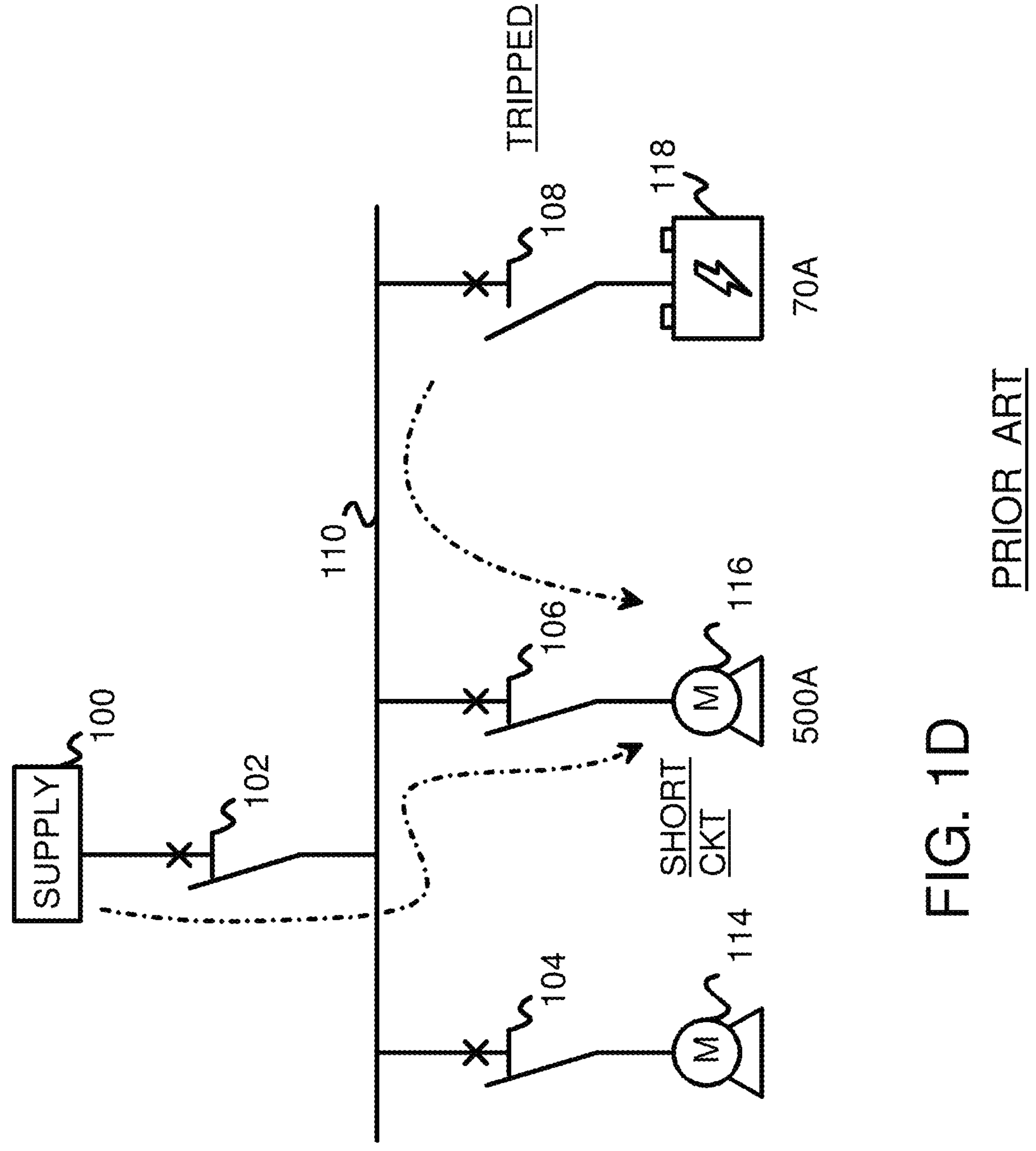
Figure 1E:
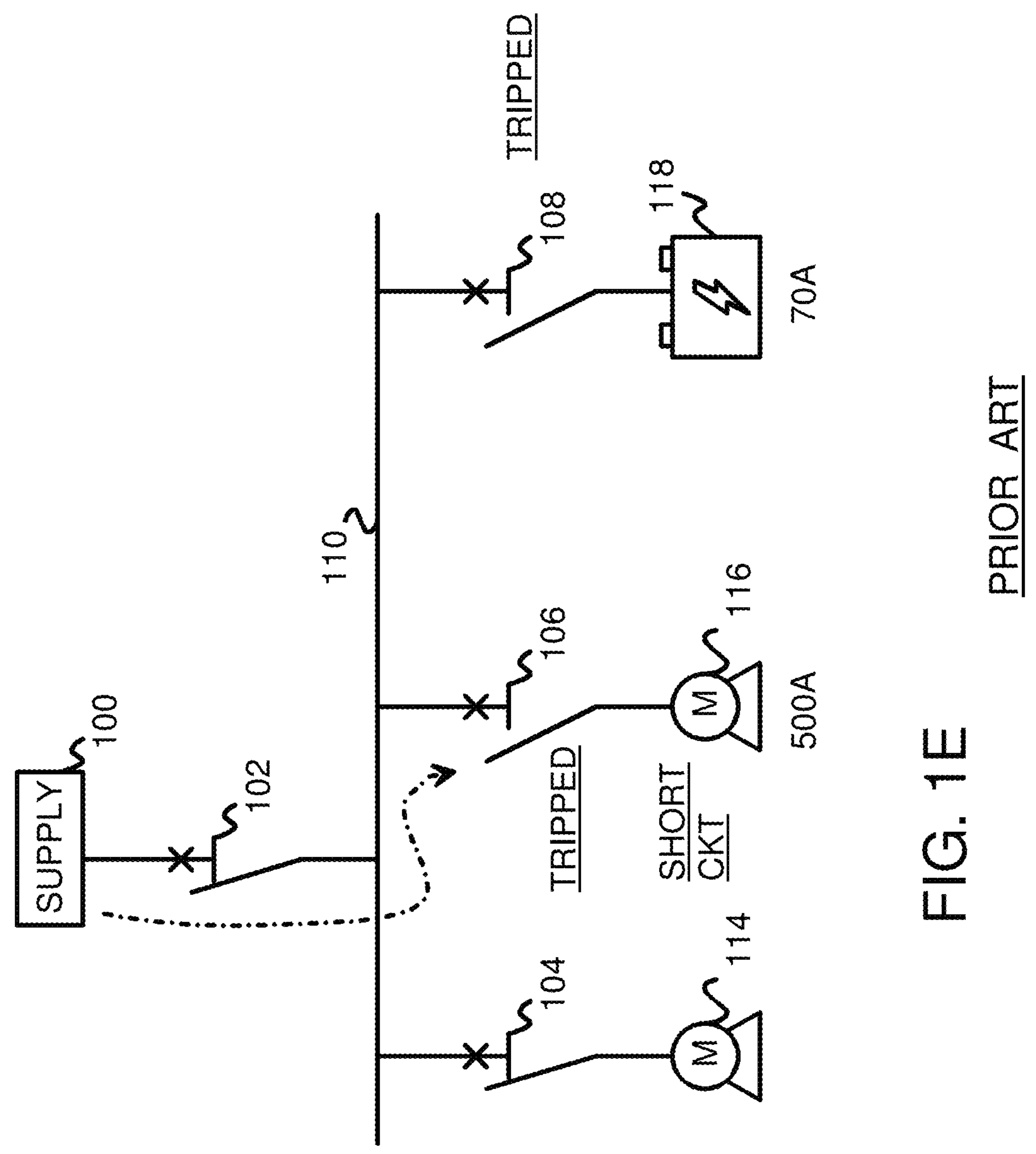
Figure 2:
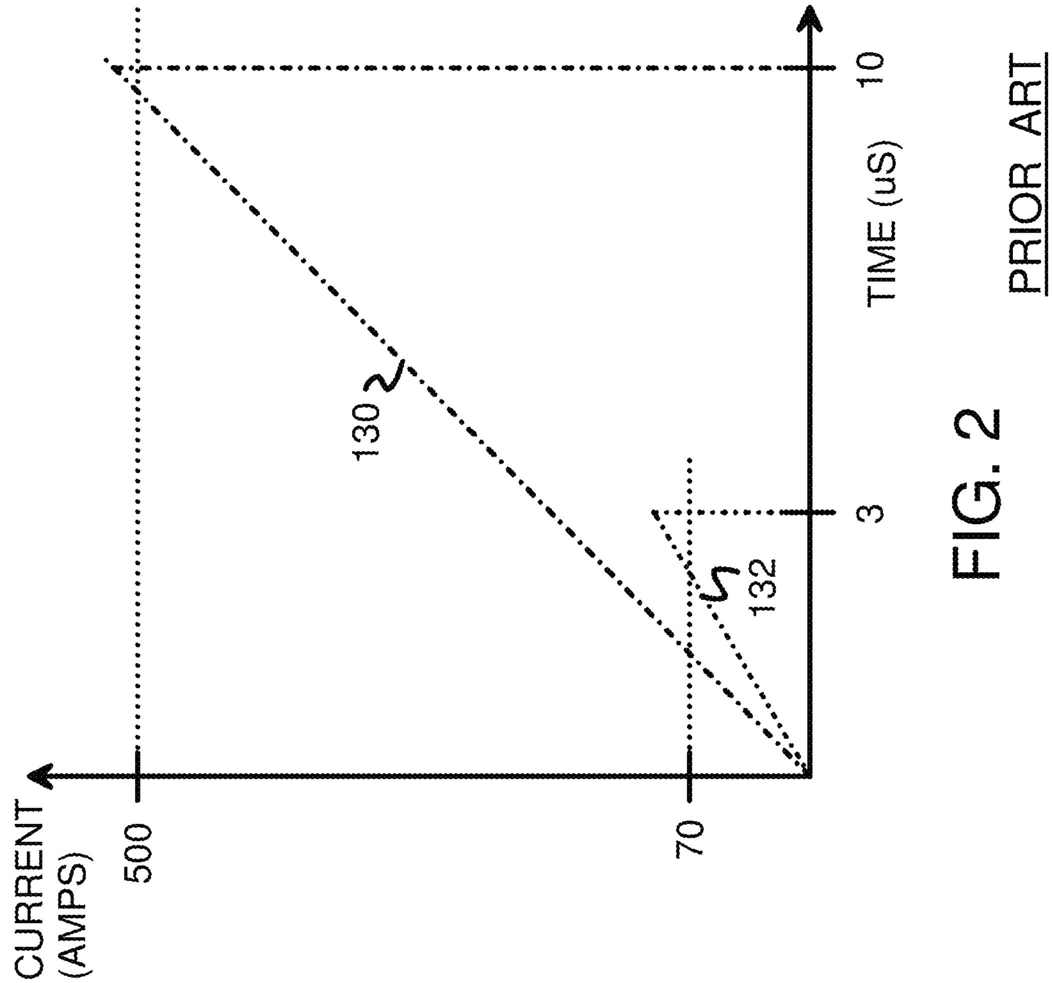
FIG. 2 is a graph showing breaking speed for the example of FIGS. 1A-1E.
Figure 3:
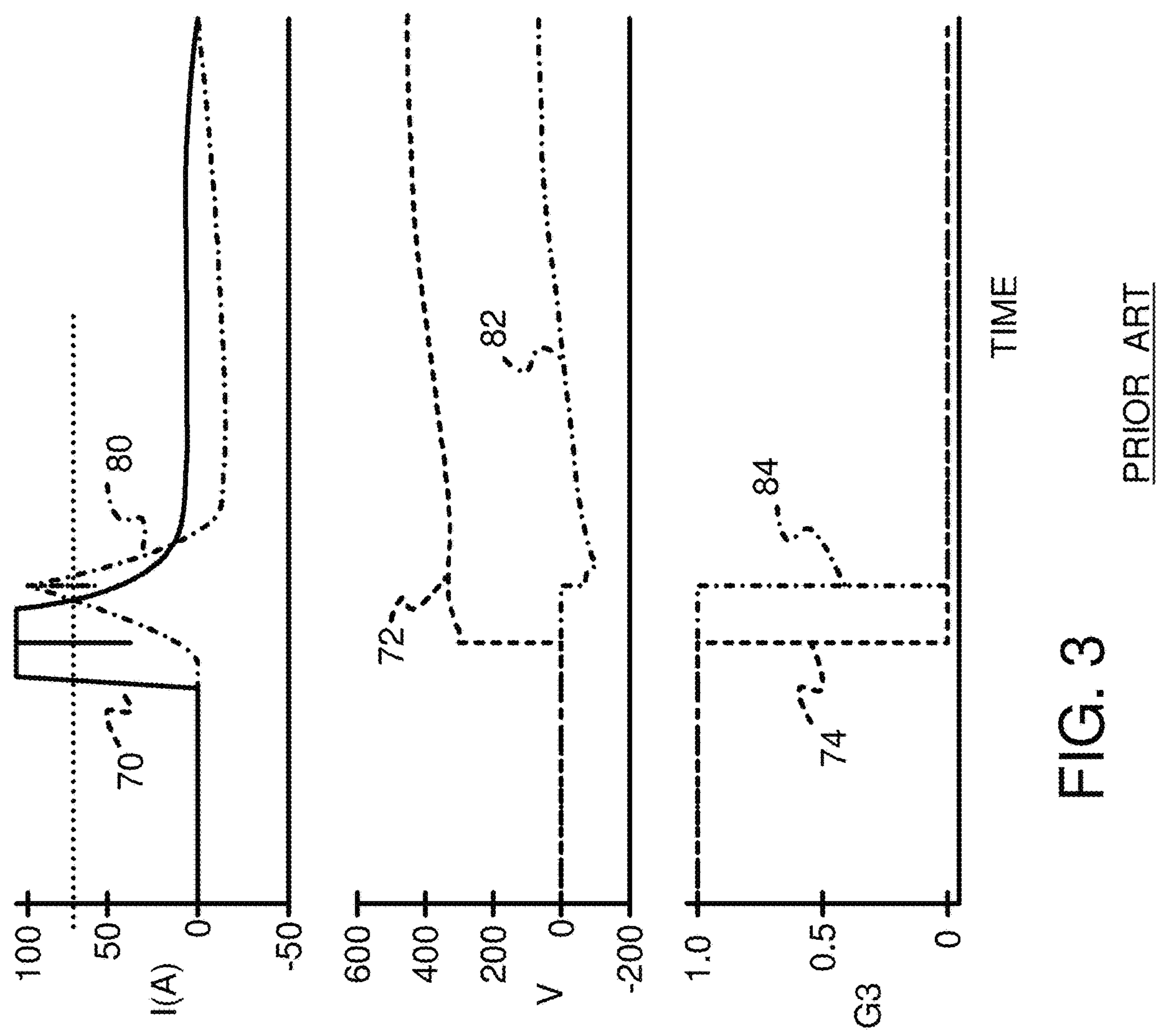
FIG. 3 shows current and voltage waveforms of the false triggering situation of FIGS. 1A-1E.

The circuit breaker of FIG. 5 can be an improved circuit breaker 108 of FIG. 1C, with protection against false triggering due to shorts in another DC load 116 in another branch, so that the false triggering of FIG. 1D is prevented. POS_IN and GND_IN can be connected to DC trunk 110 as the upstream port, while POS_OUT and GND_OUT can be connected to DC load 118 (FIG. 1C) as the downstream port.

Current sensor 40 can be used to detect fault conditions, such as over-current. Current sensor 40 can be a bidirectional sensor that can sense and measure current in either direction. The circuit breaker can trip and open when the current measured by current sensor 40 rises above the current rating in either direction to provide bidirectional protection.

Inductor 42 and current sensor 40 are in series with POS_IN. Inductor 42 resists sudden changes in input current, helping to filter input noise. The current from current sensor 40 is diverted into one of the three branches before the branches recombine to drive the downstream port's POS_OUT.

Input capacitor 36 provides a stable voltage on the input. Input capacitor 36 also decouples the input energy from the cables in DC trunk 110. Inductor 42 can likewise store energy from the input cabling. Passive input energy decoupling is provided by input capacitor 36 and inductor 42. This input energy decoupling can reduce false triggers of the circuit breaker of FIG. 5 since energy spikes caused by shorts or other faults in other branches off of DC trunk 110 (FIG. 1C) are partially absorbed by input capacitor 36 and inductor 42. Absorbing energy of the current spike and storing this energy even briefly can allow more time for circuit breaker 106 near the short to trigger and open before circuit breaker 108 is forced to falsely trigger and open. This extra time can prevent false triggering.

In addition to the passive energy decoupling provided by input capacitor 36 and inductor 42, active energy decoupling is provided by snubber capacitor 34, which is switched on and off by switch 32. Switch 32 can be a MOSFET transistor, similar to MOSFET 22. Switch 32 is controlled by control signal G4 that is applied to its gate.

During normal operation, G4 is low and switch 32 is off or open, preventing current flow to the right plate of snubber capacitor 34, disconnecting snubber capacitor 34 from the circuit. The left plate of snubber capacitor 34 is charged with POS_IN.

When a reverse current spike is detected, G4 is driven high, turning on switch 32 and closing it. Switch 32 then connects the right plate of snubber capacitor 34 to the right terminal of inductor 42, while the left plate of snubber capacitor 34 is connected to the left terminal of inductor 42. Since snubber capacitor 34 and inductor 42 are now connected in parallel by switch 32, they form an LC tank circuit. This LC tank circuit can absorb more energy than can inductor 42 alone. Some of the current and energy that would pass from inductor 42 and into current sensor 40 is diverted through switch 32 and into snubber capacitor 34.

The LC tank circuit can resonate, and the resonant frequency is determined by values of inductor 42 and snubber capacitor 34. The inductance value L may be determined by limiting the current increase speed related to the control response time. The capacitance value C may be set to provide as much resonant energy in combination with the L value. For example, L can be 3 μH and C can be 3 μF. L*C does not have to be set to the resonant frequency to be effective. Energy can be stored on the left plate of snubber capacitor 34 when switch 32 is open, and then when switch 32 closes this energy stored on snubber capacitor 34 can circulate back through switch 32 and inductor 42 and into input capacitor 36 in a resonant feedback loop to increase energy storage during a transient current spike. This stored energy can then be released back to input POS_IN over time as the transient current spike diminishes. The current and voltage spikes through current sensor 40 can be reduced in magnitude and spread over time by this energy storage and release mechanism.

Input capacitor 36 also forms a network with inductor 42 and snubber capacitor 34 when switch 32 is closed. They form a LCC network when switch 32 is closed, but the network is reduced to an LC network when switch 32 is open, as only input capacitor 36 and inductor 42 are in the LC network since snubber capacitor 34 is disconnected by switch 32. The LCC network when switch 32 is closed has a greater impedance and energy storage capacity than does the LC network when switch 32 is open.

Energy storage are greatly increased by the LCC network when switch 32 closes, providing an active boost to energy storage and current spike suppression. This greater ability to absorb energy further reduces the current through current sensor 40, reducing the possibility of false triggering.

Thus while inductor 42 and input capacitor 36 provide some passive energy decoupling, when switch 32 closes, snubber capacitor 34, inductor 42, and input capacitor 36 form a LCC network that provides greater energy decoupling as an active circuit that can be switched on and off.

Figure 6:
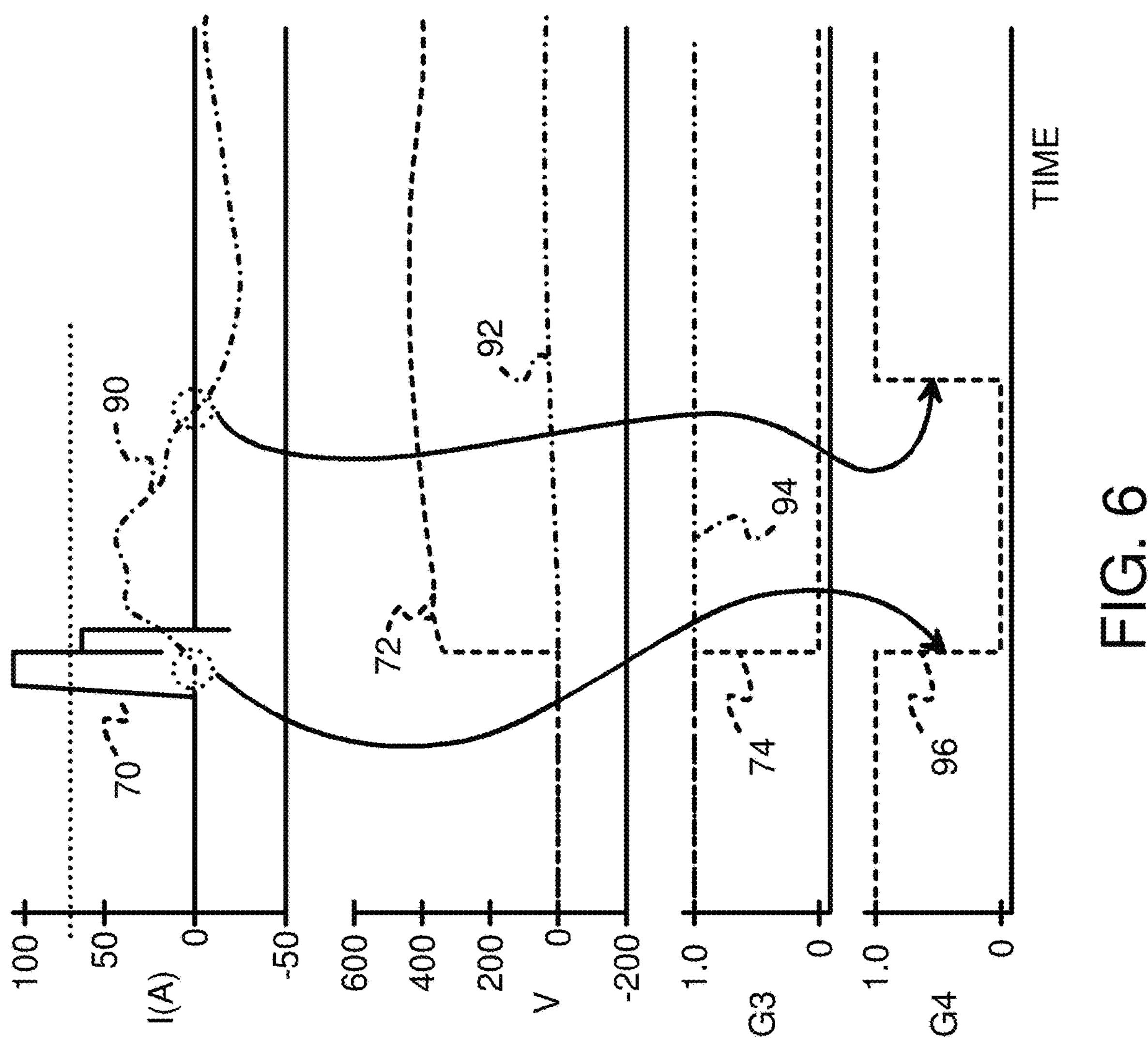
FIG. 6 shows current and voltage waveforms of the BSC circuit breaker of FIG. 5.

FIG. 6 shows current and voltage waveforms of the BSC circuit breaker of FIG. 5 preventing the false triggering situation of FIGS. 1A-1E. Waveform curves 70, 72, 74 are for circuit breaker 106 (FIG. 1C) while waveform curves 90, 92, 94, 96 are for circuit breaker 108 and FIG. 5.

Waveform curve 70 shows the current though circuit breaker 106 (FIG. 1B) when the short occurs in its DC load 116. Waveform curve 70 is clipped at the top due to the very high current spikes that occur. These current spikes eventually cause gate signal G3 to be driven low (curve 74), which opens circuit breaker 106 (FIG. 1E), causing the voltage across circuit breaker 106 to increase (curve 72).

Before circuit breaker 106 opens, current is drawn backwards though neighboring circuit breaker 108, as shown by current curve 90. When the current curve 90 reverses direction, G4 is driven high, as shown by curve 96. G4 turns on switch 32 (FIG. 5) and the LCC network that includes inductor 42, snubber capacitor 34 and input capacitor 36 increases the impedance and energy storage and reduces the slope of current curve 90. The lower slope of curve 90 causes the peak current to be reduced.

Since the peak current of current curve 90 is less than the 70 amp rating of circuit breaker 108, its G3 control signal is not driven high (curve 94) and circuit breaker 108 does not open, allowing the voltage across circuit breaker 108 to remain relatively flat (curve 92).

Once current curve 90 falls back to zero and reverses direction again, G4 is turned off, causing switch 32 to open and disconnect snubber capacitor 34 from inductor 42. Note that curve 90 shows negative (reverse) current through circuit breaker 108 (FIG. 5) while curve 70 shows positive (forward) current through circuit breaker 106.

Curves 90, 92, 94 are delayed relative to curves 70, 72, 74 due to the transmission-line delays through the cables between circuit breakers 106, 108. It takes some time for the current spike of curve 80 to propagate through the cables to neighboring DC load 118.

Figure 7A:
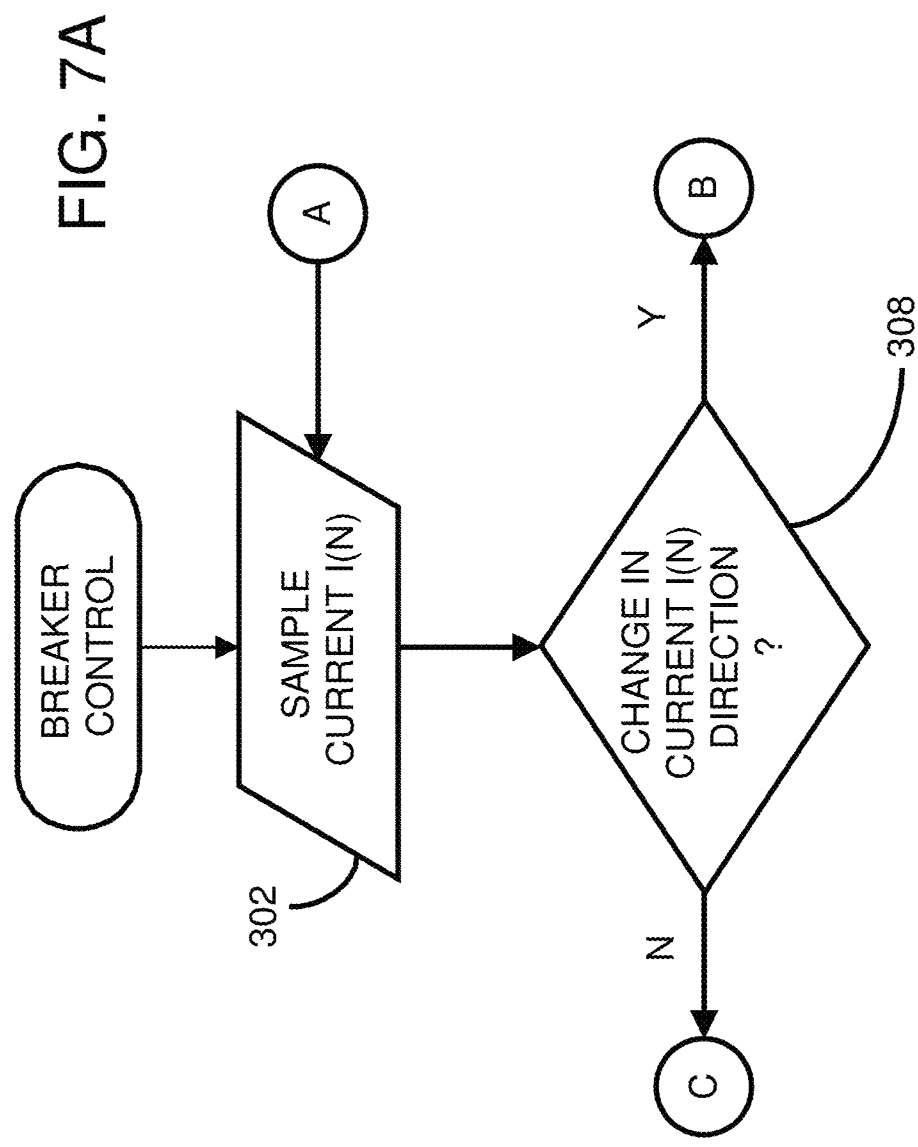
FIGS. 7A-7C show a flowchart of operation of the BSC circuit breaker of FIG. 5.
Figure 7B:
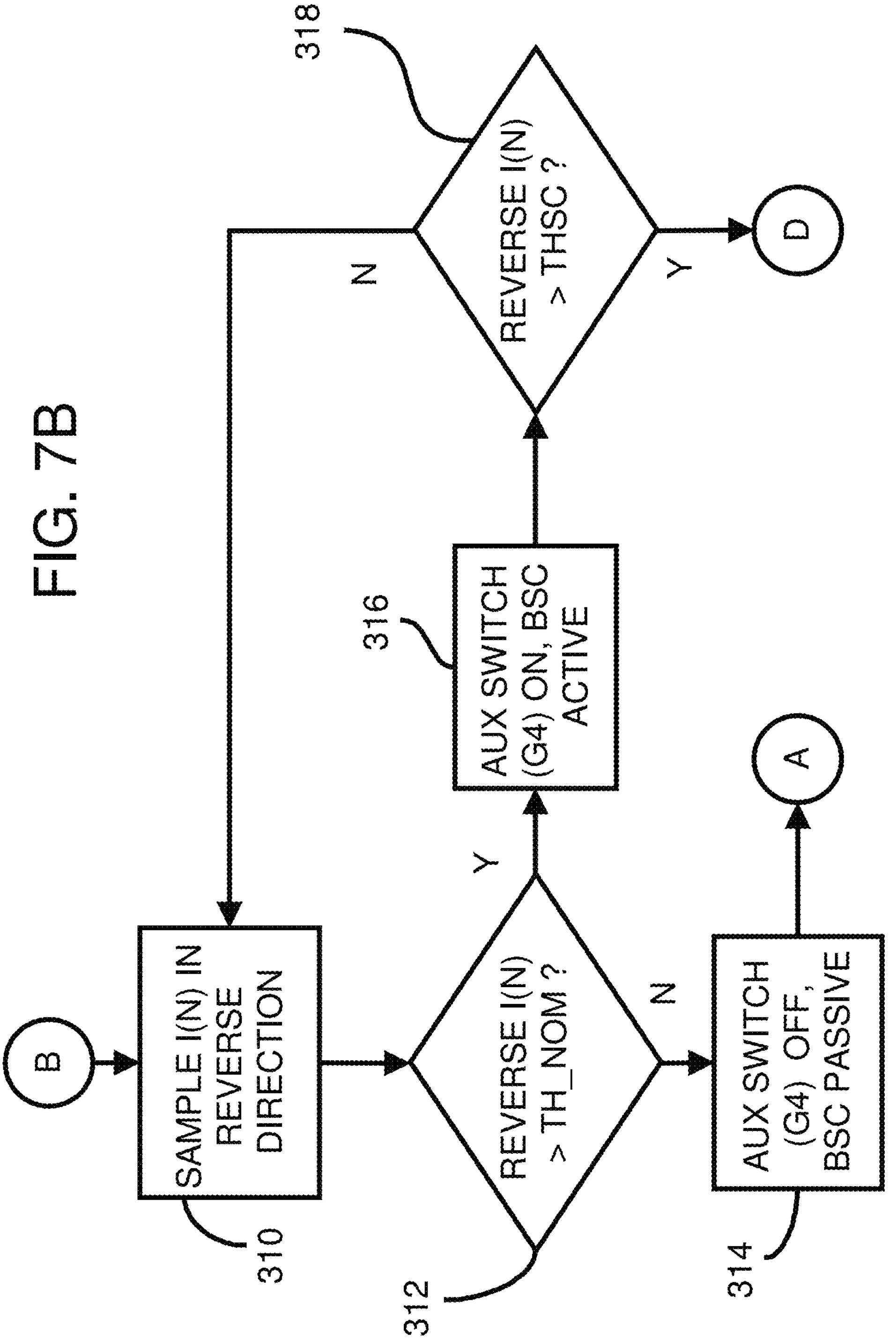
Figure 7C:
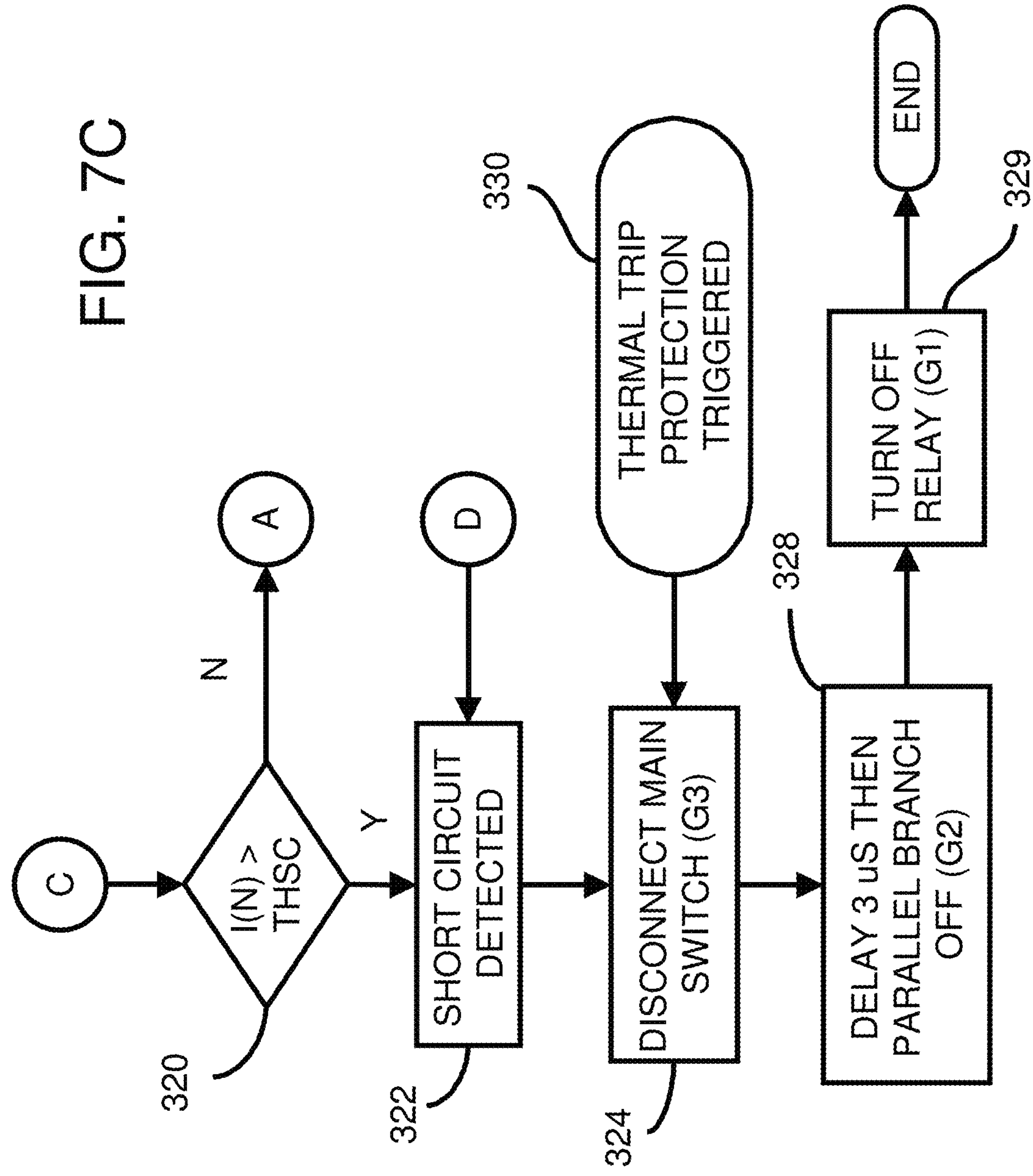

FIGS. 7A-7C show a flowchart of operation of the BSC circuit breaker of FIG. 5. In FIG. 7A, a controller that examines the current value read by current sensor 40 and possibly voltage sensors or thermal sensors (not shown) in FIG. 5 is activated. The current detected through current sensor 40 is read, step 302, as sample current I(N).

A change in direction of the current can be detected by a zero crossing of the current measured by current sensor 40. When the direction of current flow changes, step 308, the process continues in FIG. 7B. Current sensor 40 samples the current in the reverse direction, step 310. When the reverse current sensed by current sensor 40 is greater than a nominal thermal current, TH_NOM, step 312, then the controller activates G4 to turn on and close switch 32, step 316. Closing switch 32 causes snubber capacitor 34 to be in parallel with inductor 42, forming the LCC network that has increased energy storage and current spike suppression. Then inductor 42, input capacitor 36, and snubber capacitor 34 form an active BSC LCC network.

When the reverse current measured by current sensor 40 is below the short circuit threshold, THSC, step 318, then the reverse current continues to be sampled, step 310, and active BSC remains on when the reverse current measured by current sensor 40 remains above the nominal thermal current, TH_NOM, steps 312, 316.

If the reverse current measured by current sensor 40 exceeds the short circuit threshold, THSC, step 318, then a short circuit is detected, step 322.

When the reverse current measured by current sensor 40, step 310, falls below the nominal thermal current, TH_NOM, step 312, then G4 is deactivated and switch 32 is opened, step 314. Then inductor 42 and input capacitor 36 form a passive BSC LC network. Current sampling continues with step 302.

The nominal thermal current, TH_NOM, provides an offset or guard band around the zero current crossing to prevent noise near zero current from falsely activating and deactivating BSC.

When the direction of current flow does not change, step 308, the process continues in FIG. 7C. When the forward current measured by current sensor 40 does not exceed the short circuit threshold, THSC, step 320, then the process loops back to step 302, FIG. 7A, and sampling continues.

In FIG. 7C, when the forward current measured by current sensor 40 exceeds the short circuit threshold, THSC, step 320, then a short circuit is detected, step 322. G3 is driven inactive to turn off MOSFET 22 to disconnect the main branch of the circuit breaker, step 324. When a thermal sensor detects a high temperature, step 330, then step 324 is activated to turn off MOSFET 22. After a 3 μs delay, step 328, then G2 is also deactivated to turn off IGFET 24 in the parallel branch. Finally, relay 20 is turned off by G1, step 329, after a delay of about 0.1 seconds.

Figure 8:
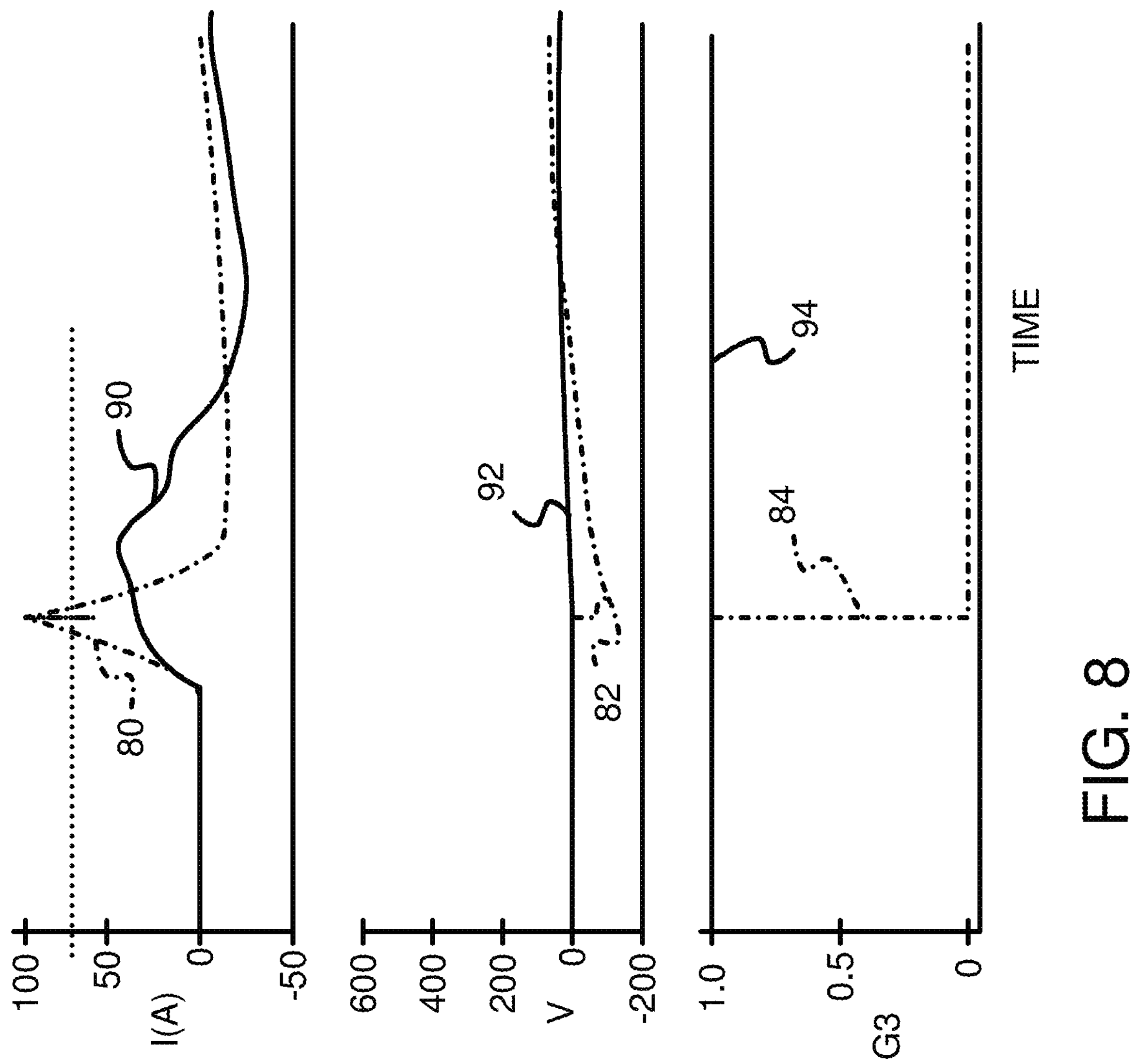
FIG. 8 compares waveforms of circuit breaker 108 of the prior art FIG. 1C and of BSC FIG. 5.

FIG. 8 shows waveforms of circuit breaker 108 of FIG. 1C both with and without BSC. Curves 80, 82, 84 show that the prior-art circuit breaker 108 without BSC has a high, sharp current peak in curve 80 that exceeds the rating of 70 amps, thus causing G3 to be activated (curve 84) and voltage to fluctuate (curve 82).

When BSC is included in circuit breaker 108, such as shown in FIG. 5, the peak of curve 90 is spread out in time and has a lower peak current. This lower peak current in curve 90 is less than the 70 amp rating, so G3 is not activated (curve 94), and the voltage remains flat (curve 92).

Figure 9:
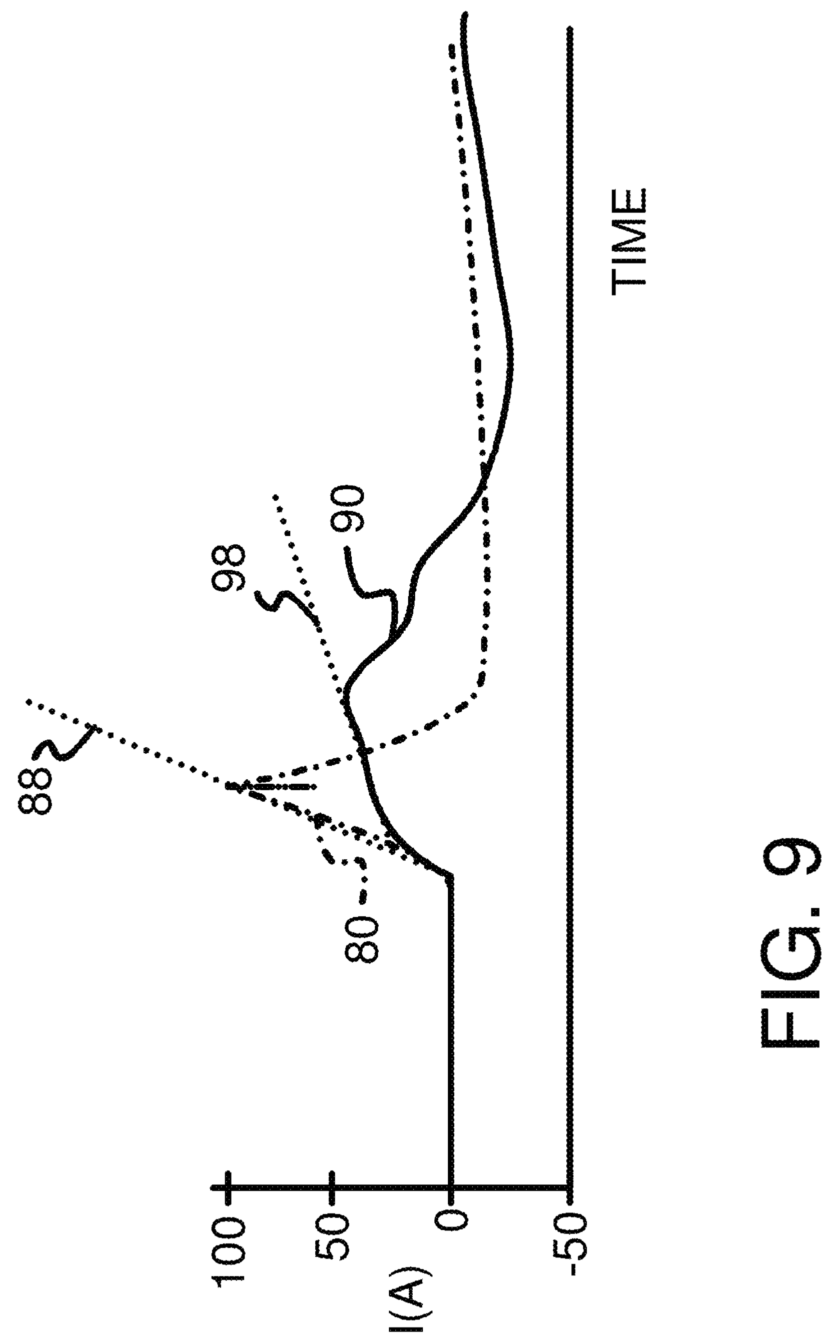
FIG. 9 is a graph showing reduced current slope due to Breaking Speed Control (BSC).

FIG. 9 is a graph showing reduced current slope due to Breaking Speed Control (BSC). The reverse current through circuit breaker 108 (FIG. 5) is shown. When BSC is not present, such as in the prior art circuit breaker 108 (FIG. 1E), current curve 80 has a large slope 88. Reverse current rises quickly to a high peak that exceeds the current rating of the circuit breaker, such as 70 amps. Thus false triggering will occur.

When BSC is provided, switch 32 closes to provide a LCC network that includes inductor 42, input capacitor 36, and snubber capacitor 34 (FIG. 5). The high impedance and energy storage of this LCC network reduces the slope of current curve 90. Slope 98 is lower than slope 88 of the prior art circuit breaker. This lower slope 98 causes the peak of current curve 90 to be delated in time and to be lower in peak current than for curve 80. The energy, or area of the peaks are about the same, but the peak of prior-art current curve 80 is shorter and higher, while the peak of BSC current curve 90 is wider and shallower, for a lower peak current. The lower peak current is more likely to be below the current rating of the circuit breaker, such as below 70 amps.

Alternate Embodiments

Several other embodiments are contemplated by the inventors. For example many combinations and variations of the circuit breaker are possible. While ground has been shown, a lower power supply such as VSS could be substituted. Relay 20 could be replaced with a second semiconductor switch, such as one that has parallel branches with a MOSET, IGBT, and varistor. The varistor could be replaces with a more complex R-C network, Additional devices such as resistors and capacitors could be added to any of the three branches of the semiconductor switch, or at other places in the circuit breaker.

In FIG. 5, snubber switch 32 and snubber capacitor 34 can be swapped so that snubber switch 32 is connected to the power input and snubber capacitor 34 connects to current sensor 40. Also, current sensor 40 can be located after MOSFET 22 rather than before MOSFET 22. As another alternative, current sensor 40 may be located before inductor 42.

While a circuit breaker trigger threshold or rating of 70 amps has been described, other current rating values could be substituted, such as 50 amps, 100 amps, 150 amps, etc. Circuit breakers 106, 108 could have different current ratings, or could have the same current rating.

The control program of FIGS. 7A-7C can be a hardware controller, a firmware routine, or a software routine executed on a processor or programmable controller, or combination of hardware, firmware, and software. A turn-on or initialization routine may be used to re-enable the circuit breaker by activating G1, G2, and G3. This turn-on routine may be activated when power is restored or on command from a high-level control program, or after waiting some period of time.

Varistor 30 (FIG. 5) could be in parallel with a resistor and a capacitor to form a protection network. The R and C values of the resistor and capacitor can be set to a desired RC value to limit the voltage across sensitive components such as MOSFET 22 when MOSFET 22 and IGBT 24 are shut off. A voltage sensor could be added to sense the output voltage on POS_OUT. The output voltage from this voltage sensor can be used to detect over-voltage and voltage dip conditions.

More complex 3-pole circuit breakers can be designed that are bi-directional. The circuit breaker of FIG. 5 can be extended to a 3-pole bi-directional circuit breaker by adding additional semiconductor switches in series in the positive pole path between POS_IN and POS_OUT. An additional semiconductor switch could be added between NEG_IN and NEG_OUT.

One or two series-connected and mirrored ground-current IGBT can be added that are in parallel across mechanical relay 20.

Still another 3-pole bi-directional circuit breaker can be generated from by adding diodes around the semiconductor switch in the positive pole. Another set of four diodes may be added around a semiconductor switch in the negative pole.

While current sensor 40 and inductor 42 have been shown on the input of the semiconductor switch, current sensor 40 could be moved to the output of the semiconductor switch, or current sensor 40 could be located within the semiconductor switch network. More complex networks could be used for inductor 42, and also for varistor 30, input capacitor 36, and snubber capacitor 34. Other kinds of variable resistors other than varistor 30 could be used to tune the RC network. The rating of varistor 30 could be fixed after prototypes are tested. Additional passive components could be added to the RC network.

Various kinds of faults can be detected, such as a current over-load with or without an output-voltage dip, an output voltage dip without a current over-load, a short circuit, an over-voltage of the output voltage, and various combinations. When the operating conditions move outside of the normal operating area, MOSFET 22 can be turned off immediately and quickly, except when the operating conditions move from the normal operating area into an over-current region or a voltage dip region, where disconnection may be delayed until the integrated current exceeds the threshold or after a period of time for a voltage dip. MOSFET 22 can be immediately disconnected when a voltage dip region is entered, while IGBT 24 may remain on until a time period has elapsed. Thus a temporary voltage dip has only a reduction in current drive, a partial disconnection.

While delays of 3 μs are described for the delay between turn on/off of MOSFET 22 and IGBT 24, other delay values could be substituted. Likewise, the other delays could be added or adjusted to other values. Voltage and current values could also be changed. The internal power-supply voltage Vcc could differ from POS_IN, or could be derived or divided-down from POS_IN. The value of nominal current value I(N) may be adjusted for different loads and environments.

Mechanical relay 20 can be an elctromechanical relay, such as a mono-polar contactor, part of a multi-pole relay, cryogenic contactors, a vacuum switch, Thompson coil actuator, DC contactor, normally-on or normally-off. While a normally-open relay has been described for mechanical relay 20, a normally-closed relay could also be used for mechanical relay 20. The polarity of gate signals, such as G1, may be reversed as needed. A normally-closed relay may still be considered to be activated by G1 to close and de-activated by G1 to open the relay, even though the default state of the relay is closed rather than open. The first gate signal to the relay may be a power signal to the relay that energizes the relay to close, for a normally-open relay, or open, for a normally-closed relay. For a normally-closed relay, the power signal applied to the relay may be considered to be an inverse of a positive gate signal G1, or an active-low gate signal G1.

Similarly, MOSFET 22 could be a depletion-mode transistor rather than an enhancement-mode transistor and have a normally-conducting state rather than a normally-isolated state. MOSFET 22 could be a p-channel device rather than an n-channel device. Likewise, PNP rather than NPN may be used for IGBT 24, with or without an insulated gate, or IGBT 24 may be replaced with a MOSFET or other semiconductor device.

More complex thermal models could be used for step 330, or a simple current integrator could be used. Multiple thresholds could be used, or the threshold or delays could be re-programmed or selected based on the application, environment, or other characteristics. Values could be scaled or otherwise operated upon. Parameters such as delays and targets could be adjusted or scaled based on conditions such as device temperature or length of time between detected faults, or statistics or properties of the particular load being driven. For example, large loads with large capacitances could have a longer setting for the delay and a larger value of the short circuit threshold THSC, steps 318, 320, than do loads with smaller capacitances or with less switching of load capacitances. When the load uses a higher-frequency clock, these values could be increased to allow for more capacitor charging.

Some kinds of faults could be disabled while others are enabled. Different applications or uses of the circuit breaker could have fault identification for some kinds of faults enabled, but fault identification for other kinds of faults disabled. Under-Voltage Lock-Out (UVLO) could be supported by providing a fault signal to downstream devices in the load that could disable themselves while the circuit breaker continues to operate. Additional steps may be added to the flowchart of FIGS. 7A-7C for these additional features.

Additional fault types could be identified. Some faults could activate a fault signal to controllers within the load circuitry, which could act on these fault signals such as by suspending, sleeping, slowing, or shutting down certain blocks within the load. The circuit breaker device might otherwise ignore these faults that are identified for use by external controllers. Fault signals could be sent to other blocks as electrical signals, could be encoded together, or could be sent wirelessly, such as by BlueTooth.

Control logic such as a start-up detector, over-load detector, over-voltage detector, voltage-dip detector, over-current detector, and gate drivers that generates G1, G2, G3, G4 could be implemented in hardware, firmware, software, or combinations, such as programmable controllers. Delays could be generated by timers, dividers, or system clocks, system interrupts, command loops, etc.

While one MOSFET 22 in series (FIG. 5) has been shown, a different number of MOSFETs 22 in series may be used, such as 2, 4, 8, 10, 16, etc. All of MOSFETs 22 in series could have the same size, or their sizes could be different, such as being tapered. Various featured and geometries could be used for MOSFET 22 and for IGBT 24, such as doughnut transistors, circular or ringed gates, multi-leg transistors, guard rings, etc.

A resistor could be added in series with the emitter of ground-current IGBT 24. Alternately, resistor 26 in series with the emitter of IGBT 24 could be removed, or parasitic resistances of IGBT 24 could suffice.

More complex buffers, level shifters, or other components could be substituted or added. Inversions could be added at various locations. Hysteresis of other delays and output wave shaping could be added. Rather than use CMOS inverters, other kinds of buffer circuits, selectors, or muxes may be used.

Different transistor, capacitor, resistor, and other device sizes can be used, and various layout arrangements can be used, such as multi-leg, ring, doughnut or irregular-shape transistors. Currents can be positive or negative and flow in either direction. Many second and third order circuit effects may be present and may be significant, especially for smaller device sizes. A circuit simulation may be used to account for these secondary factors during design.

Devices may be implemented using n-channel, p-channel, or bipolar transistors, or junctions within these transistors. The gate lengths and spacings can be increased to provide better protection from damage.

Many variations of IC semiconductor manufacturing processes are possible. Various materials may be used. Additional process steps may be added, such as for additional metal layers or for other transistor types or modification of standard complementary metal-oxide-semiconductor (CMOS) transistors when the transistors are integrated onto a larger device. While complementary metal-oxide-semiconductor (CMOS) transistors have been described, other kinds of transistors could be substituted for some embodiments, such as n-channel only, p-channel only when the output swing can be limited, or various alternate transistor technologies such as Bipolar or BiCMOS. The CMOS process may be a Fin Field-Effect Transistor (FinFET) process.

Terms such as up, down, above, under, horizontal, vertical, inside, outside, are relative and depend on the viewpoint and are not meant to limit the invention to a particular perspective. Devices may be rotated so that vertical is horizontal and horizontal is vertical, so these terms are viewer dependent.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A Breaking Speed Control (BSC) circuit breaker comprising:

a power input for connecting to a power source;

an inductor connected to the power input and to an intermediate node;

a current sensor and a semiconductor switch connected in series between the intermediate node and a power output to a load that is protected by the BSC circuit breaker;

a snubber capacitor;

a snubber switch that is controlled by a fourth gate signal;

wherein the snubber switch and the snubber capacitor are connected in series between the power input and the intermediate node; and a controller that drives the fourth gate signal to close the snubber switch when the current sensor detects a reverse current through the semiconductor switch, the reverse current flowing in a reverse direction from the load to the power input;

wherein the controller drives the fourth gate signal to open the snubber switch and disconnect the snubber capacitor from the inductor when the reverse current is not detected;

wherein breaking speed is reduced by increased input energy absorption of the inductor and snubber capacitor when the snubber switch is closed.

2. The BSC circuit breaker of claim 1 further comprising:

an input capacitor connected between the power input and a ground input.

3. The BSC circuit breaker of claim 2 wherein the BSC circuit breaker is a Direct Current (DC) circuit breaker with bidirectional protection;

wherein the power input is connected to a DC trunk that is connected to the power source, the DC trunk having branches to branch loads that are protected by local circuit breakers;

wherein the reverse current is caused by a short in a branch load protected by a local circuit breaker having a current trigger rating that is higher than a current trigger rating of the BSC circuit breaker.

4. The BSC circuit breaker of claim 3 wherein the semiconductor switch further comprises:

a main branch having a Metal-Oxide-Semiconductor Field-Effect Transistor (MOSFET) having a gate controlled by a third gate signal; and a bypass branch having a bipolar transistor that is switched on and off by a second gate signal;

wherein the main branch and the bypass branch are connected in parallel with each other.

5. The BSC circuit breaker of claim 4 wherein the semiconductor switch further comprises:

a passive branch having a passive network of a resistor and a capacitor;

wherein the main branch, the bypass branch, and the passive branch are connected in parallel with each other.

6. The BSC circuit breaker of claim 4 further comprising:

a relay connected between the ground input from a power supply and a ground output to a load, the relay being an electromechanical relay responsive to a first gate signal.

7. The BSC circuit breaker of claim 6 further comprising:

gate drivers for generating a start-up sequence and for generating a shut-down sequence that is activated by faults;

wherein the start-up sequence activates the first, second, and third gate signals in that order with a delay between each activation, so that the relay is activated first, then the bipolar transistor after a delay, and then the MOSFET after another delay;

wherein the shut-down sequence deactivates the third, second, and first gate signals in that order with a delay between each deactivation, so that the MOSFET is deactivated first, then the bipolar transistor after a delay, and then the relay after another delay.

8. The BSC circuit breaker of claim 7 wherein the bipolar transistor is an Insulated Gate Bipolar Transistor (IGBT) having an insulated gate over a base, wherein the insulated gate receives the second gate signal.

9. A circuit breaker comprising:

an inductor having a first terminal connected to a power input and having a second terminal;

a current sensor;

a semiconductor switch coupled in series with the current sensor and with the inductor to switch current between the power input and a power output;

a Metal-Oxide-Semiconductor Field-Effect Transistor (MOSFET) having a gate controlled by a third gate signal, the MOSFET in a first branch in the semiconductor switch, the MOSFET coupled between an input and an output of the semiconductor switch;

a snubber switch having a gate controlled by a fourth gate signal;

a snubber capacitor connected in series with the snubber switch between the power input and the second terminal of the inductor; and a controller that drives the fourth gate signal active when the current sensor detects a reverse current flowing in a reverse direction from the power output to the power input;

wherein the snubber switch closes to connect the snubber capacitor across the first terminal and the second terminal of the inductor when the fourth gate signal is activated when reverse current is detected by the current sensor.

10. The circuit breaker of claim 9 wherein the inductor and the snubber capacitor are connected in parallel and form an LC tank circuit when the snubber switch is closed, the LC tank circuit absorbing energy from the reverse current flowing out of the power input, wherein energy absorbed reduces a peak current measured by the current sensor;

wherein reducing the peak current reduces false triggering when an upstream fault pulls reverse current through the circuit breaker.

11. The circuit breaker of claim 9 further comprising:

an input capacitor coupled to the power input;

wherein the input capacitor and the inductor form a passive LC network when the snubber switch is open, the passive LC network able to absorb a first amount of energy from a reverse current spike on the power input;

wherein the input capacitor and the inductor and the snubber capacitor form an active LCC network when the snubber switch is closed, the active LCC network able to absorb a second amount of energy from the reverse current spike on the power input;

wherein the second amount of energy is greater than the first amount of energy, wherein energy absorption from the reverse current spike is increased when the snubber switch is closed.

12. The circuit breaker of claim 11 wherein the input capacitor is connected between the power input and a ground input.

13. The circuit breaker of claim 12 further comprising:

a mechanical relay connected between the ground input and a ground output and controlled by a first gate signal.

14. The circuit breaker of claim 13 further comprising:

an output diode connected between the power output and the ground output.

15. The circuit breaker of claim 14 further comprising:

an Insulated Gate Bipolar Transistor (IGBT) in series with a resistor in a second branch between the input and the output of the semiconductor switch, the IGBT having a control gate that is controlled by a second gate signal.

16. The circuit breaker of claim 15 further comprising:

a varistor coupled between the input and the output of the semiconductor switch in a third branch.

17. The circuit breaker of claim 16 wherein the controller drives the fourth gate signal active when the current sensor detects the reverse current flowing in the reverse direction from the power output to the power input and the reverse current is greater than a nominal current value;

wherein the fourth gate signal is not activated for near-zero current values.

18. The circuit breaker of claim 17 wherein when the reverse current exceeds a short-circuit threshold, the controller drives the third gate signal to an inactive state to disable the MOSFET, then the controller waits for a period of time before driving the second gate signal to an inactive state to disable the IGBT.

19. A circuit breaker with upstream fault tolerance comprising:

a power input to an upstream power source and to upstream loads;

an inductor connected between the power input and a first node;

a current sensor connected between the first node and a second node;

a semiconductor switch connected between the second node and a power output to a load, the semiconductor switch having a transistor controlled by a main gate signal;

an input capacitor connected between the power input and a ground input;

a snubber capacitor connected between the power input and a snubber node;

a snubber switch connected between the snubber node and the first node; the snubber switch controlled by a snubber gate signal;

a snubber controller that drives the snubber gate signal to an active state that closes the snubber switch when the current sensor detects a reverse current flowing from the second node to the first node, the snubber controller driving the snubber gate signal to an inactive state when the current sensor detects a forward current flowing from the first node to the second node; and a main controller that drives the main gate signal to an inactive state that turns off the transistor to disconnect the second node from the power output when the current sensor detects a current that exceeds a trigger current.

20. The circuit breaker of claim 19 further comprising:

a mechanical relay connected between the ground input and a ground output and controlled by a first gate signal from the main controller.

* * * * *